April 14, 1925.
G. H. BARROTT
1,533,364
CHARGE VAPORIZER FOR MANIFOLD BRANCHES
Filed Feb. 18, 1922
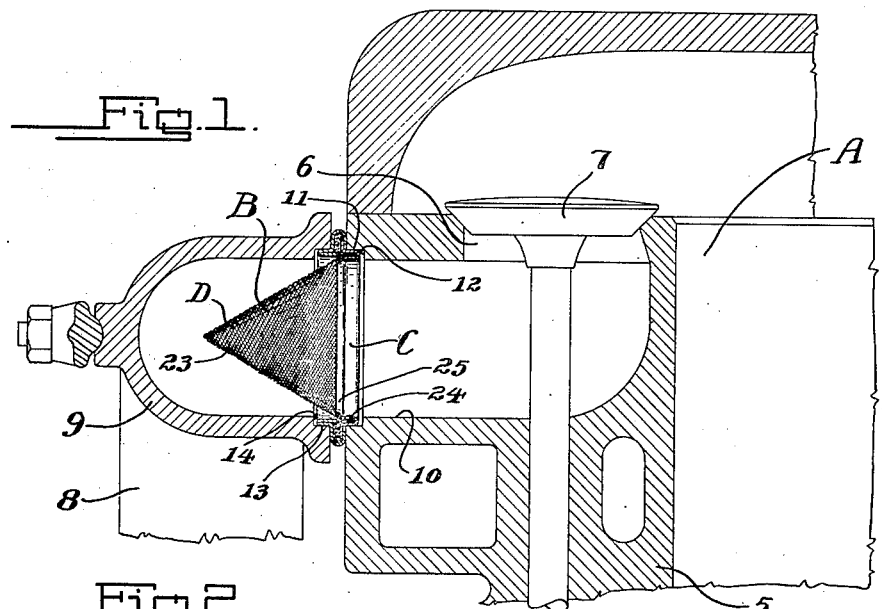
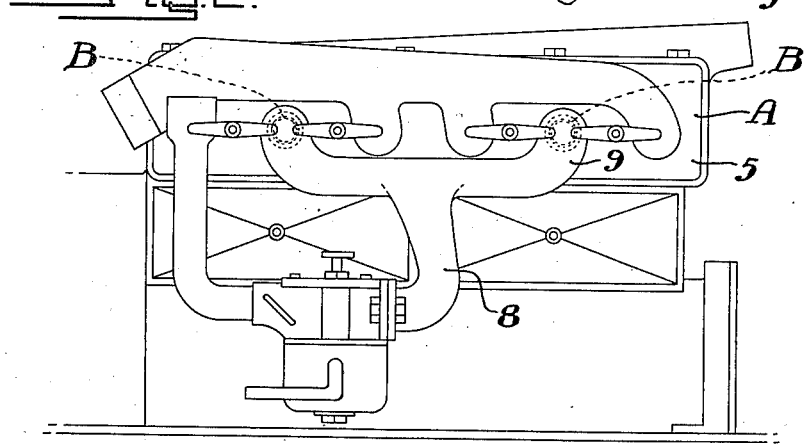
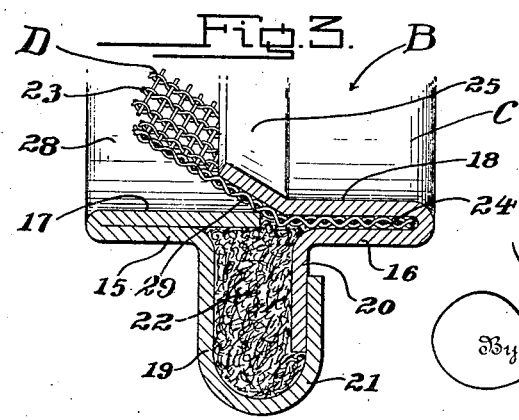
Inventor
George H. Barrott
By Lancaster & Allwine
Attorneys

Patented Apr. 14, 1925.

1,533,364

UNITED STATES PATENT OFFICE.

GEORGE HARTWELL BARROTT, OF SHELBURNE FALLS, MASSACHUSETTS, ASSIGNOR TO BARROTT STAMPING COMPANY, OF SHELBURNE FALLS, MASSACHUSETTS, A CORPORATION OF MASSACHUSETTS.

CHARGE VAPORIZER FOR MANIFOLD BRANCHES.

Application filed February 18, 1922. Serial No. 537,611.

*To all whom it may concern:*

Be it known that I, GEORGE H. BARROTT, a citizen of the United States, residing at Shelburne Falls, in the county of Franklin and State of Massachusetts, have invented certain new and useful Improvements in Charge Vaporizers for Manifold Branches, of which the following is a specification.

This invention relates to attachments for internal combustion engines and has for its primary object to provide a novel device of simple construction, which will effectively permit the introducing into the engine's cylinders of a perfect firing charge, thereby resulting in the material saving of fuel and give a smooth running engine, without the forming of carbon deposits.

In the carburetion of present day fuel for internal combustion engines, the carburetor fails to fully vaporize the fuel and condensation of the fuel after carburetion often takes place in the intake manifold. Raw globules of gasoline often pass into the engine cylinder unmixed with air and merely burn off leaving carbon, and often portion of this fuel finds its way into the crank case, causing crank case dilution and impairing the bearings. It has heretofore been contemplated of preheating the fuel prior to its entrance into the firing chamber, and while the raising of the temperature of the fuel, may to a certain extent increase the explosive quality of the mixture, the preheating thereof causes expansion of the mixture and decreasing the ratio of expansion in the firing chamber on which the principle of the engine depends.

It is therefore, a prime object of the invention to provide a novel device disposed intermediate the intake manifold and the cylinder block for causing the effective breaking up of the gasoline globules, and the effective carburetion of the mixture, the device effective preventing the heating of the mixture beyond a predetermined degree and allowing any raw globules of gasoline to fall and collect on a hot portion of the manifold, thus causing the vaporizing thereof and thus permit the effective use thereof, the said device positively preventing the entrance of all raw particles of gasoline into the firing chambers.

Another object of the invention is to provide the combination of a conical screen formed of metal having the quality of conducting heat very slowly, thus maintaining a limited thermal action, and a novel seamless gasket for holding the conical screen, the wire conical screen and the gasket cooperating to bring about the proper mixing of the charge, the gasket being for the purpose of seating intermediate the intake manifold branches and the cylinder block and holding the cone in correct position in relation to the engine cylinders, the inclined surface of the conical screen allowing raw particles of gasoline to be guided upon the gasket, which forms a collecting ring for the same, the gasket allowing the vaporizing of the said raw particles.

A further object of the invention is the provision of a conical wire screen formed of brass arranged to extend with its apex pointing into the intake manifold and away from the engine cylinders, thereby preventing the forming of carbon deposits upon the same, the conical shape of the wire screen tending to spread the charge and thoroughly intermix the component charge thereof and acting to prevent passage of flame back through the manifold in case of backfiring and the like.

A further object of the invention is to provide a conical brass screen, and a novel means for holding the screen in its place by a seamless gasket, the screen being kept cool by the incoming charge which has a refrigerating effect on the manifold, and the limited application of heat is made by radiation through the screen which is a very slow conductor of heat, thus effectively preventing the undue expansion of the charge prior to its entrance into the cylinders.

A still further object of the invention is to provide an improved recarburetor for internal combustion engines of the above character, which will be durable and efficient in use, one that will be easy to manufacture, and one which will be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is an enlarged fragmentary vertical transverse section through an internal combustion engine with the improved device in operative position, the device being shown in diametric section.

Figure 2 is a side elevation of an internal combustion engine, illustrating in dotted lines, the relation of the improved devices with the internal combustion engine.

Figure 3 is an enlarged fragmentary diametric section through the improved device per se.

Referring to the drawings in detail, wherein similar reference characters designate corresponding parts throughout the several views, the letter A indicates an internal combustion engine; and B, the improved device for permitting the perfect carburetion of the charge prior to its entrance into the engine cylinders.

The internal combustion engine A can be of the usual or any preferred character and forms no part of the present invention, but has been merely illustrated to show the position of the invention to said engine, which forms an important part of the device.

As shown, the engine A includes the usual cylinder block 5, provided with inlet ports 6, the passage of the mixture therethrough being controlled by the inlet valve 7. The intake manifold 8 is provided with the usual branches 9, and each branch 9 as shown, supplies the charge for two cylinders. While I have shown the improved devices only applied to a four cylinder engine, it is to be understood that the same may be applied to any type of engine embodying any number of cylinders. As shown, the intake openings 19 of the cylinder blocks are rabbeted as at 11, to form a stop shoulder 12, the purpose of which will be hereinafter more fully apparent. Each of the branches 9 of the manifold 8 are also rabbeted, as at 13 to provide an annular stop shoulder 14, the purpose of which will also be hereinafter more fully described.

In an intake manifold embodying two branches, there will be two of the devices, and in an engine in which the manifold is provided for a branch for each cylinder, there will be a device for each cylinder. In other words, one of the improved devices is provided for each branch of the intake manifold.

Inasmuch as all of these devices are constructed the same, only one will be described in detail.

The improved device B includes the retaining ring C and the mixer D.

It is contemplated of utilizing a packing gasket of the McCord type, illustrated in Patent #1,387,648, issued August 16, 1921 for the retaining ring for holding the mixer D in position and the combination of the gasket and the mixer D forms a unitary article which cooperates to bring about the desired result. As shown this gasket is of the seamless type and includes the companion sections 15 and 16 having inwardly extending annular base flanges 17 and 18 and outwardly extending flanges 19 and 20, the flange 19 being bent, as at 21, in engagement with the flange 20 and the flanges 19 and 20 and the bent portion 21 are adapted to be positioned between the intake manifold branches 9 and the cylinder block 5, and the flanges 15 and 16 are adapted to rest in the rabbeted portions 11 and 13. A suitable packing 22 is positioned between the flanges 19 and 20 and the portion 21 in order to effectively prevent the leakage of the charge from between the intake manifold branches 9 and the cylinder block 5.

The portion D is preferably formed of brass gauze of the desired gauge, and consists of a conical body 23. The base portion of the conical body 23 is bent inwardly to provide a connecting flange 24 which is inserted intermediate the base flanges 18 of the section 16 which firmly clamp the same in position. The inner flange 18 or ring is also provided with a base portion 25 for reinforcing the base portion of the conical body 23 of the portion 25 is inclined to conform to the inclination of the cone 23. The gasket C is formed of copper, while the screen, as stated, is formed of brass. It is to be noted that the screen cone 23 extends in substantially the central portion of the gasket C and the flange 17 forms a ledge on which raw particles of gasoline are adapted to collect as will be hereinafter more fully described, and this ledge forms an important part of this invention. The position of the device B also forms an important feature of the invention, and the apex of the cone 23 projects into the manifold and away from the inlet opening 10, and thus the screen is positioned entirely out of the cylinder block, which prevents the undue heating thereof and the depositing of carbon thereon, but it can be seen that the conical screen is positioned close enough to the intake to prevent the condensation of the mixture after the same has passed through the screen or gauze cone.

In operation of the improved device, the inflowing charge will come into contact with the gauze cone 23 which is formed of brass, which is a poor conductor of heat, and this cone will be kept cool by the inflowing charge and thus having a cooling effect on the charge and prevent the undue expansion thereof.

The gauze will effectively break up all particles of raw gasoline and air. Any raw particles or globules of gasoline which may collect on the cone will roll down the inclined sides of the gauze cone and collect on the ledge 28, which is formed of copper and in direct contact with the manifold and engine block which will vaporize said gasoline for permitting the effective use thereof. The ledge 28 and inclined portion 25 form an annular pocket or recess 29 at the base of the cone 23 for preventing the unvaporized fuel from entering the explosive chamber.

From the foregoing, it can be seen that only a part of the charge is expanded or vaporized.

The advantages of introducing a perfect charge into the firing chambers of the engine will readily be apparent to persons conversant with internal combustion engines, and it is readily apparent that a great saving of fuel will result besides a smooth running engine.

Changes in details may be made without departing from the spirit or scope of this invention; but,

I claim:

1. As a new article of manufacture, a charge mixing device comprising a gasket including companion sections consisting of base flanges and right angularly extending flanges, one of the outwardly extending flanges being bent over the other outwardly extending flange, a packing interposed between the outwardly extending flanges, a gauze cone having its base portion disposed between the base flanges or one of the sections of the gasket, one of said base flanges being provided with an inclined extension engaging the inclined base portion of the cone.

2. As a new article of manufacture, a charge mixing device for internal combustion engines comprising a gasket including annular base flanges, and outwardly extending flanges, a foraminous cone including an annular base, the gasket base flanges being adapted to receive said annular portion of the cone, and one of said base flanges being inclined to conform to the inclination of the base of the cone to reinforce the same.

3. A charge mixing device for internal combustion engines comprising a gasket including companion sections consisting of base flanges and right angular extending flanges, a foraminous cone having its base portion disposed between the base flanges on one of the sections of the gasket, a ledge formed by the base flange of the companion section surrounding said cone, said first mentioned base flange being provided with an inclined extension adapted to engage the inclined base portion of the cone and to overlie a portion of said ledge.

4. A charge mixing device comprising a gasket adapted for interposition between the intake manifold and cylinder of an internal combustion engine, said gasket including companion sections consisting of base flanges and right angular extending flanges, a gauze cone having its base portion disposed foremost in the direction of travel of fuel from the intake to the cylinder, an inclined portion provided on one of said base flanges for engaging the inclined base portion of the cone, a ledge formed by the base flange of the companion section, said inclined portion and ledge providing an annular pocket impervious to liquid at the base of said cone for entrapping raw globules of gasoline, whereby the raw globules will be vaporized before passing through the cone and into the cylinder.

GEORGE HARTWELL BARROTT.